US008630485B2

(12) United States Patent
Cok et al.

(10) Patent No.: US 8,630,485 B2
(45) Date of Patent: Jan. 14, 2014

(54) METHOD FOR COMBINING IMAGE AND IMAGING PRODUCT

(75) Inventors: Ronald S. Cok, Rochester, NY (US);
Anthony Scalise, Fairport, NY (US);
Peter O. Stubler, Rochester, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 525 days.

(21) Appl. No.: 12/717,440

(22) Filed: Mar. 4, 2010

(65) Prior Publication Data

US 2011/0216966 A1 Sep. 8, 2011

(51) Int. Cl.
*G06K 9/00* (2006.01)

(52) U.S. Cl.
USPC .......................................................... 382/162

(58) Field of Classification Search
None
See application file for complete search history.

(56) References Cited

U.S. PATENT DOCUMENTS

| | | | |
|---|---|---|---|
| 5,901,245 A | 5/1999 | Warnick et al. | |
| 6,188,786 B1* | 2/2001 | Ueda et al. | 382/165 |
| 6,282,317 B1 | 8/2001 | Luo et al. | |
| 6,711,291 B1 | 3/2004 | Stubler et al. | |
| 6,859,210 B2 | 2/2005 | Luo et al. | |
| 7,000,192 B2 | 2/2006 | Allen et al. | |
| 7,003,505 B1* | 2/2006 | Funakoshi | 1/1 |
| 2002/0040375 A1 | 4/2002 | Simon et al. | |
| 2003/0021468 A1* | 1/2003 | Jia et al. | 382/162 |
| 2003/0198384 A1* | 10/2003 | Vrhel | 382/190 |
| 2004/0119726 A1* | 6/2004 | Li | 345/629 |
| 2005/0146537 A1 | 7/2005 | Yamakado et al. | |
| 2008/0050039 A1* | 2/2008 | Jin | 382/284 |
| 2008/0301546 A1 | 12/2008 | Moore et al. | |
| 2009/0110296 A1* | 4/2009 | Sekiguchi et al. | 382/218 |

FOREIGN PATENT DOCUMENTS

| | | |
|---|---|---|
| CA | 2 581 022 | 9/2008 |
| JP | 2005 236372 | 9/2005 |

OTHER PUBLICATIONS

C. Lundstrom, A. Ynnerman, P. Ljung, A. Persson, and H. Knutsson. The alpha-histogram: Using spatial coherence to enhance histograms and transfer function design. In Proceedings Eurographics/IEEE-VGTC Symposium on Visualization 2006, May 2006.*
Balasubramanian et al., "A new approach to palette selection for color images" Journal Imaging Technology, vol. 17, pp. 284-290, 1991.
Foley, et al., "Computer Graphics Principles and Practice", Addison-Wesley, Boston, 1996.
Anil K. Jain, "Algorithms for Clustering Data" Prentice-Hall, Englewood Cliffs, NJ, 1988.
Chevreul, "The Principles of Harmony and Contrast of Colors and Their Applications to the Arts" Schiffer, West Chester, PA, 1987.
Itten, "The Elements of Color", John Wiley & Sons, Germany, 2003.
www.DeGraeve.com, "Color Palette Generator", Feb. 2010.
Meier, B.J. "ACE: a color expert system for user interface design", Proceedings of the ACM SIGGRAPH Symposium on User Interface Software, 1998, pp. 117-128.
Stricker M. et al., "Color indexing with weak spatial constraints", Proceedings of the SPIE Storage and Retrieval for Image and Video Databases, vol. 2670, 1996, pp. 1-5.

* cited by examiner

Primary Examiner — Nirav G Patel

(57) ABSTRACT

A method of combining an image with an imaging-related product, comprising: providing an image; forming an image-color histogram of spatially-coherent color clusters within the image, the image-color histogram indicating the frequency of occurrence of spatially-coherent related colors in the image; selecting one or more of the image colors having a frequency of occurrence in the image high enough to be visible to an image observer; selecting an imaging-related product having one or more of the selected high-frequency colors within the imaging-related product or having a color complementary to one or more of the selected high-frequency colors within the imaging-related product; and combining the image and the imaging-related product.

22 Claims, 5 Drawing Sheets

METHOD FOR COMBINING IMAGE AND IMAGING PRODUCT

FIELD OF THE INVENTION

The present invention relates to combining images with imaging-related products to provide an improved aesthetic combination.

BACKGROUND

Products that include images are a popular keepsake or gift for many people. Such products typically include a picture taken by an individual that is inserted into a product intended to enhance the presentation of the image or to provide storage for the image. Examples of such products include picture albums, posters, calendars, mugs, ornaments, mouse pads and post cards. Images can be enhanced in several ways, for example by image processing to modify the image content and thereby improve the perceived quality or value of the images. Images can also be combined with other images, for example templates including background images and one or more image openings into which an individual's image can be inserted, either mechanically or electronically with a computer, to form a combined image that displays the individual's image in a pleasing or preferred manner.

However, some users have difficulty in combining their images with available templates or other imaging-related product. For example, some people have difficulty accurately determining color, particularly on uncalibrated displays and under artificial lighting, so that matching colors in the image with colors in the template may not provide a pleasing result. Thus, it can be that available templates do not combine with a desired image to form an aesthetic result. Other people can have difficulty with color matching or do not desire to do color matching or otherwise select imaging-related products to complement their image. Moreover, simple color selections can lead to undesirable results. For example, the average color of an image is typically gray, even for colorful images. If the average color of an image is employed and is desired to match an imaging-related product, a gray product may be chosen. While such a neutral color may be acceptable to some, others can desire a more colorful product with more aesthetic appeal.

Some of these problems are addressed in the prior art. For example, U.S. Pat. No. 7,000,192 entitled "Method of Producing a Matted Image Usable in a Scrapbook", describes a method of producing a matted image usable in a scrapbook. The method comprises the steps of displaying a digital image having a matte area surrounding an image opening. A plurality of color selections from which a user can select a preferred color are provided and the selected color is used in the matte. The color selections can be obtained from an analysis of the digital image, thereby ensuring that the matte color matches a color from the digital image. However, simply selecting colors that occur frequently in an image can provide unacceptable results. For example, some colors may not be easily distinguishable to a viewer if they are part of a texture. Additionally, some colors may be found in image locations that do not complement a matte, or may correspond to colors that are unacceptable for a matte. While a user may choose a suitable color that overcomes these deficiencies, it is desirable to automate the color selection process to enable users to be efficient and effective.

It is known in the art to create color palettes by analyzing the colors in an image. Such color palettes can be used for purposes such as displaying digital images on color displays capable of representing only a limited number of colors (e.g., 256). For example, the article "A new approach to palette selection for color images" by Balasubramanian et al. (Journal Imaging Technology, Vol. 17, pp. 284-290, 1991) discloses a method for determining a palette of colors based on the distribution of colors in the input digital image. A similar method is disclosed in U.S. Pat. No. 6,859,210 to Luo et al., entitled "Method for representing a digital color image using a set of palette colors based on detected important colors." Such methods are also known to be useful for determining website color palettes.

U.S. Pat. No. 6,711,291 describes the use of colors found in an image to provide a textual caption with a selected color within the image. The selected color can be found within the image by forming a color histogram of the entire image. Colors within the histogram are then candidate colors. A candidate color having suitable contrast with the area in which the textual caption is to be placed is selected and the textual caption of the suitably-contrasting color combined with the image. However, this process can still yield undesirable results. A color found in the histogram at a high frequency may be, for example, part of a large textured area that includes multiple colors. Thus, the high-frequency color used in, for example, a matte, may not provide a pleasing combination, since the specific color within the textured area may not be readily apparent to a viewer.

There is a need therefore, for an improved method for selecting a color from within an image and matching the color to an imaging-related product with which the image is to be combined.

SUMMARY OF THE INVENTION

In accordance with the present invention, there is provided a method of combining an image with an imaging-related product, comprising:

a) providing an image;

b) forming an image-color histogram of spatially-coherent color clusters within the image, the image-color histogram indicating the frequency of occurrence of spatially-coherent related colors in the image;

c) selecting one or more of the image colors having a frequency of occurrence in the image high enough to be visible to an image observer;

d) selecting an imaging-related product having one or more of the selected high-frequency colors within the imaging-related product or having a color complementary to one or more of the selected high-frequency colors within the imaging-related product; and e) combining the image and the imaging-related product.

The present invention has the advantage that more suitable colors are selected from an image and employed in an imaging-related product with which the image is to be combined resulting in a more aesthetically pleasing result.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Figure 1:
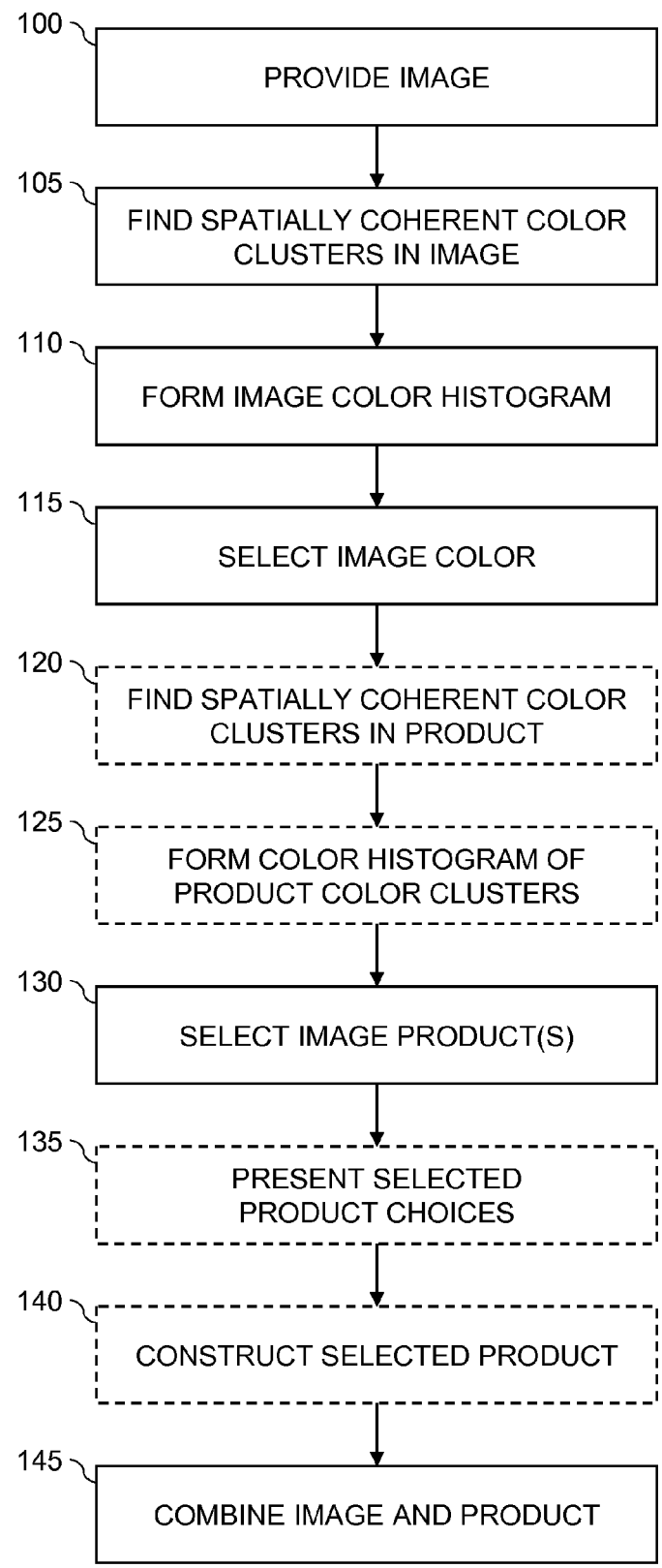
FIG. 1 is a flow chart of a method according to an embodiment of the present invention.

In an embodiment of the present invention illustrated in FIG. 1, a method of combining an image with an imaging-related product comprises a provide image step 100, a find spatially-coherent color clusters in image step 105, and a form color histogram of image color clusters step 110, the color histogram indicating the frequency of occurrence of spatially-coherent related colors in the image. A select image color step 115 selects one or more of the image colors from the color histogram having a frequency of occurrence in the image high enough to be visible to an image observer. A select image product(s) step 130 selects an imaging-related product having one or more of the selected high-frequency colors within the imaging-related product or having a color complementary to one or more of the selected high-frequency colors within the imaging-related product. Finally, a combine image and product step 145 combines the image and the imaging-related product to form a desired integrated product.

In an alternative method of the present invention, the select image product(s) step 130 is used to select a plurality of imaging-related products having one or more of the selected high-frequency colors within the imaging-related product or having a color complementary to one or more of the selected high-frequency colors within the imaging-related product. The plurality of imaging-related products provides a customer with a corresponding plurality of product choices. The plurality of imaging-related products or a representation of the plurality of imaging-related products can be optionally presented to a user using a present selected product choices step 135, for example in a graphic user interface presented on a website or in a software application. To aid a user in selecting from among the plurality of imaging-related products, the plurality of imaging-related products or the representation of the plurality of imaging-related products can be presented in an order, for example on a web page displaying the product choices from left to right and from top to bottom. The order can be derived in different ways, for example by frequency of customer choice or by a quality-of-match metric relating the matching of image and imaging-related product colors. For example, a quality-of-match metric can be calculated from a degree of matching for each of the plurality of imaging-related products and the image and the order can be defined by the degree of matching. Such calculations can be done by an image processor known in the art.

In another embodiment of the present invention, the imaging-related product can include more than one image color having a high frequency of occurrence and a plurality of image colors are used in matching and selecting the imaging-related product. Both, matching colors or complementary colors can be chosen so that the imaging-related product can include more than one color matching or complementary to an image color having a high frequency of occurrence. In yet another alternative embodiment, the imaging-related product can have both a neutral color and a selected color (either matching or complementary). In some cases, no single high-frequency color or related color is dominant within an image, so that a greater variety of color options can be preferred.

In a conventional photograph, it is often the case that an object in the scene can have slightly varying colors or the color of a scene element varies. Such variation can be taken into account when forming the color clusters. In an alternative embodiment, the color clusters can be derived from a portion of an object that has a texture. In this case, the texture can be reproduced within the imaging-related product.

The steps of the method of the present invention can be performed in various orders. In one exemplary order, the imaging-related product is constructed before the image is provided. This is useful, for example, when the imaging-related product is not printed with the image, for example when the imaging-related product is a frame or mug or cardboard matte. In an alternative order, the imaging-related product is constructed after the color is selected using an optional construct selected product step 140. This can be useful when the combined image and imaging-related product are constructed together, for example as can be done for printed photocards. The imaging-related product for photocards can include a surround (composited matte) or background template with image openings and a predetermined design. In this embodiment, the image and the imaging-related product are composited, for example with an image processor, and printed together on a common sheet of photographic paper or on printing paper. In this instance, the actual image color selected in the select image color step 119 can be used in the imaging-related product, rather than selecting a best match from a set of available pre-constructed imaging-related products.

Referring to FIG. 1, in another embodiment of the present invention, an optional find spatially coherent color clusters in product step 120 can be used to find spatially coherent color clusters in the imaging-related product. A form product color histogram of product color clusters step 125 is then used to form a product color histogram that indicates the frequency of occurrence of spatially coherent related colors in the imaging-related product (as opposed to color clusters within the image). The select image product(s) step 130 determines one or more product colors having a frequency of occurrence high enough to be visible to an image observer, and matches the imaging-related product colors with the image colors to match the image with the imaging-related product. As noted above, the matches can be ordered in a list that is presented to a user for selection. Alternatively, selections can be made automatically.

Figure 2:
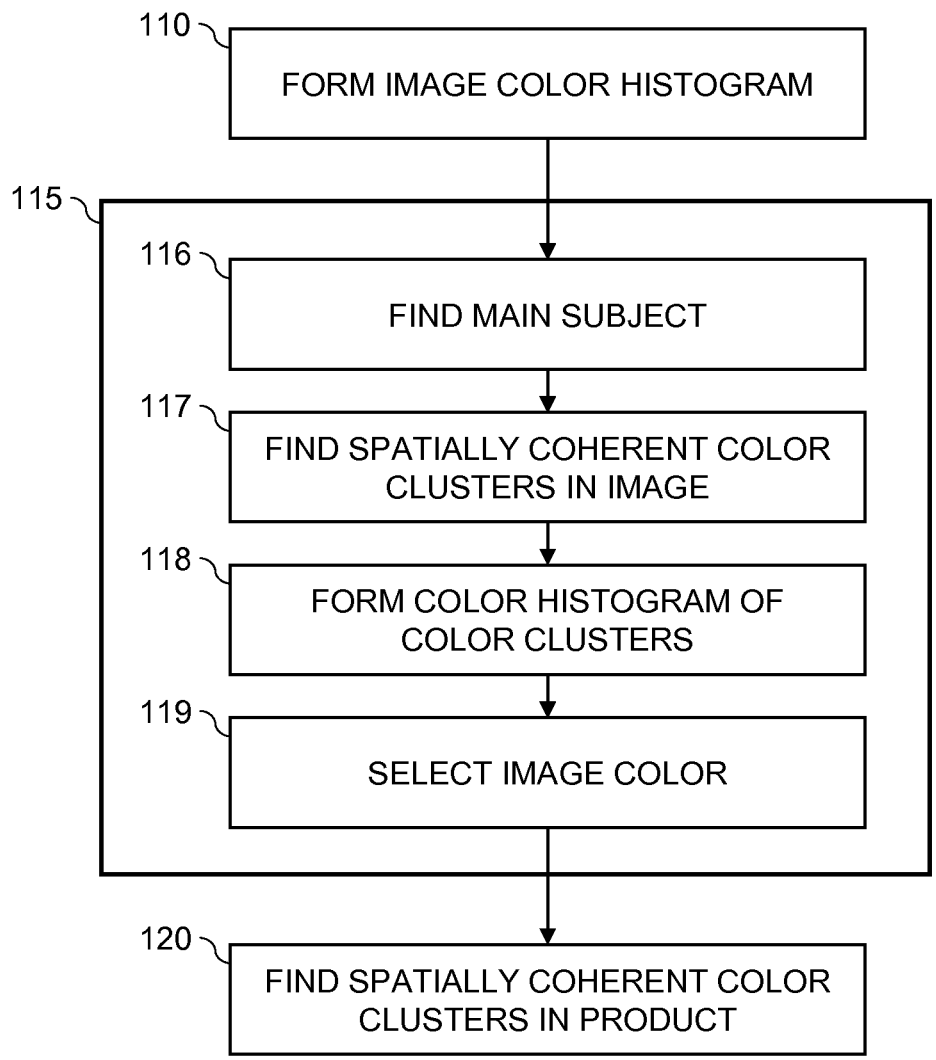
FIG. 2 is a flow chart of a method according to an alternate embodiment of the present invention.

Experience has shown that color clusters found within a main subject in a scene can be preferred for use in imaging-related products, while flesh tones are generally not preferred in an imaging-related product. Therefore, in yet another alternative embodiment of the present invention illustrated in FIG. 2, the main subject of the image can be found using a find main subject step 116. A find spatially coherent color clusters in image step 117 is used to find spatially coherent color groups within the main subject. A form color histogram of color clusters step 118 is used to determine a color histogram of the colors in the spatially coherent color clusters. Finally, a select image color step 119 is used to select an image color that is not a flesh tone. Main-subject determination is a process well-known to those skilled in the art and is described, for example, in U.S. Pat. No. 6,282,317.

According to various embodiments of the present invention, the imaging-related product can be any type of product known in the art including, but not limited to, a picture frame, an album cover, a mug, a calendar page, a matte, or a page surround matte or template in a photocard or album page.

The image provided by the provide image step 100 can be a digital image. Optionally, the provided image can be a hard copy image such as a photograph print or transparency, which can be scanned to form a digital image. The calculation of the color clusters and formation of the color histograms can be done by using a digital processor to process the provided image, for example with a digital computer or image or signal processor, all of which are commercially available.

Composited products can be composited using similar computing hardware and printed, for example, using thermal-transfer printers onto thermal paper, using ink-jet printers onto specialized photo paper or plain paper, or using electro-photographic printers. Products such as framed pictures can be assembled by hand using prints of customer images.

Figure 3:
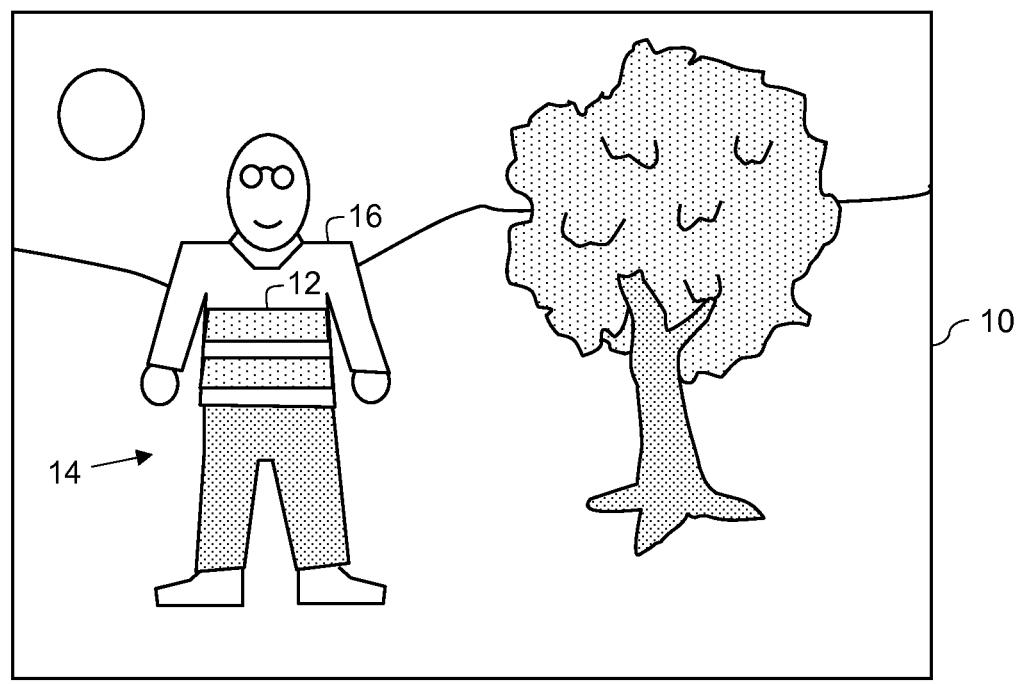
FIG. 3 is an image useful in understanding the method of an embodiment of the present invention.

Referring to FIG. 3, the method of the present invention can be practiced operationally by a user who provides a digital image 10, for example an image captured by a digital camera or scanned from a print. The user can then access an internet web site through a commercially-available browser and upload the digital image 10 to a storage device accessed through the web site. The digital image 10 can then be processed by a computer to determine spatially-coherent color clusters (e.g., color clusters 12 and 16). An image color histogram is then formed from the color clusters 12 and 16, and one or more image colors are selected from the image color histogram.

Figure 4:
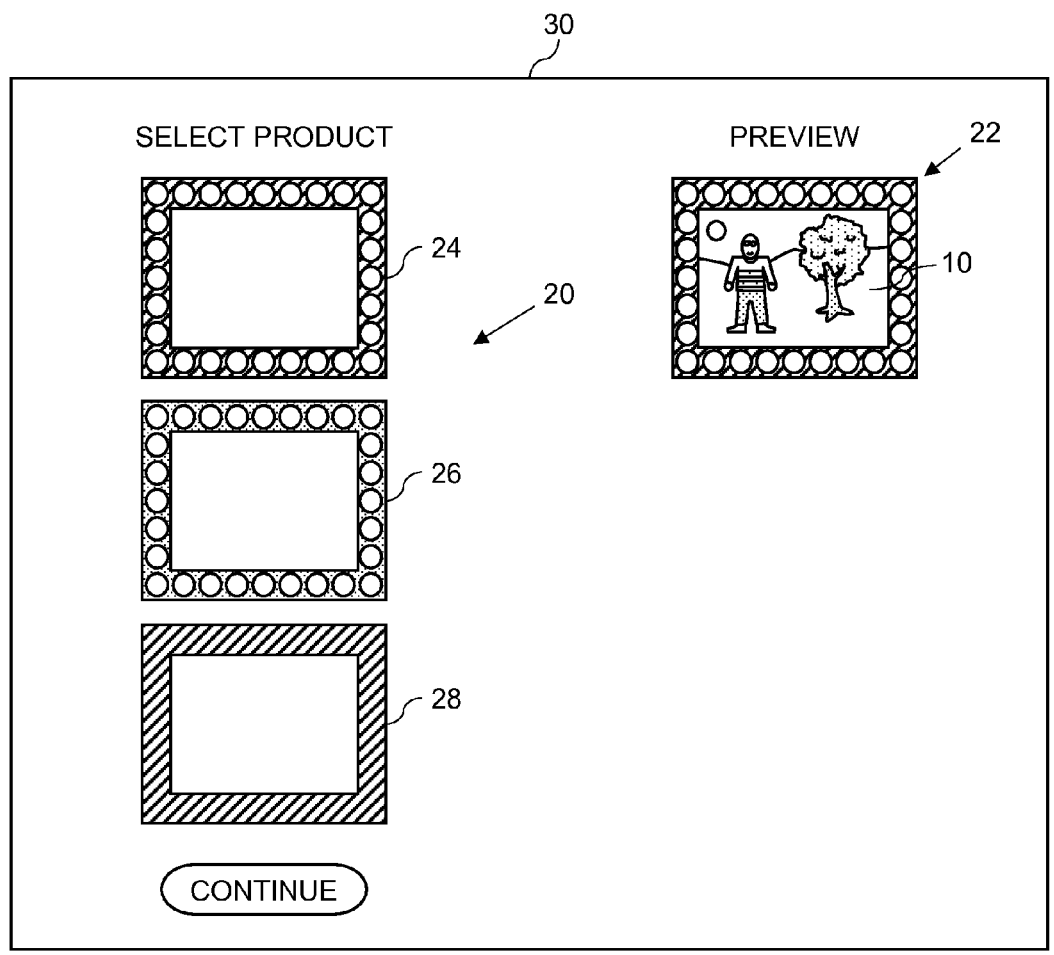
FIG. 4 is a presentation screen useful in implementing a method of an embodiment of the present invention.

FIG. 4 shows an example presentation window 30 associated with a user interface that can be provided on an internet web site or in a software application according to the method of the present invention. The selected one or more image colors can then be integrated into one or more imaging-related products 20, which are presented to the user as choices. In this example the imaging-related products 20 represent three different matte surrounds 24, 26 and 28. A variety of color choices can be provided and ordered to assist the user in making a selection. For example, matte surround 24 can include colors corresponding to both color clusters 12 and 16. Alternatively, matte surround 26 can include a neutral color together with a color corresponding to color cluster 16. Matte surround 28 illustrates a third option incorporating a single image color corresponding to color cluster 16. Additionally, the imaging-related products 20 (or a digital image of the imaging-related product) can be processed to determine product color clusters and corresponding product color histograms. The colors in the product color histograms can also be used to improve the color matching between the digital image 10 and the imaging-related products 20.

In one embodiment, a main subject detection algorithm is used to identify a main subject 14 in the digital image 10. Imaging-related products 20 can then preferentially be chosen containing colors corresponding to color clusters 12 that are contained within the main subject 14 rather than colors corresponding to color clusters 16 that are in the background of the digital image 10.

The presentation window 30 also includes a sample presentation 22 of the digital image 10 shown in combination with one of the imaging-related products 20 for purposes of giving the user a preview of the combination. A user interface can be provided to allow the user to select different imaging-related products 20 and to update the sample presentation 22 to preview the selected imaging-related product 20.

When the user is satisfied with the combination of the digital image 10 and the imaging-related product 20, the user can add the combined product to a shopping cart and proceed with a product ordering process as is well-known to those skilled in the art. The user selection is then transferred to a production facility, together with the user's digital image for construction and shipping. For some types of imaging-related products, for example picture frames, a pre-made element is combined with a print of the user's image. For other types of imaging-related products, for example album pages or photocards, the imaging-related product is produced at the same time as the user's image, typically with the image composited into the product by an image-processor.

As used herein, a spatially coherent color cluster is a group of similarly-colored pixels that are spatially adjacent within an image. A color that occurs frequently within an image does not necessarily occur within color clusters. For example, the color may occur in small areas scattered throughout the image. Therefore, use of an average color, or a color found predominantly within an image does not necessarily provide a good color match to an imaging-related product. Such imaging-related products can artistically benefit from matching accent colors within an image that can be derived from color clusters in order to ensure that the colors are easily visible to an image observer.

A variety of computational image processing techniques can be employed to form spatially coherent color clusters. Color clusters can be determined by measuring the spatial distance between pixels within the image that have similar colors as described below. Similar colors can be determined by measuring differences in hue to form a color distance value. Threshold values can be employed to define a minimum spatial cluster size and color variation (color distance) and groups of pixels meeting the threshold requirements can be determined. Typically, it is desirable that the minimum spatial cluster size is large enough to be readily perceived within an image at a suitable viewing distance.

Alternatively, object segmentation within a scene can be used to determine major areas within a scene, for example as described in U.S. Pat. No. 5,901,245, and then color clusters within each segment determined. By measuring the size of each cluster, as well as the frequency of occurrence of pixels of the corresponding color within the cluster, an image can undergo color segmentation and, colors suitable for matching can be determined.

Figure 5:
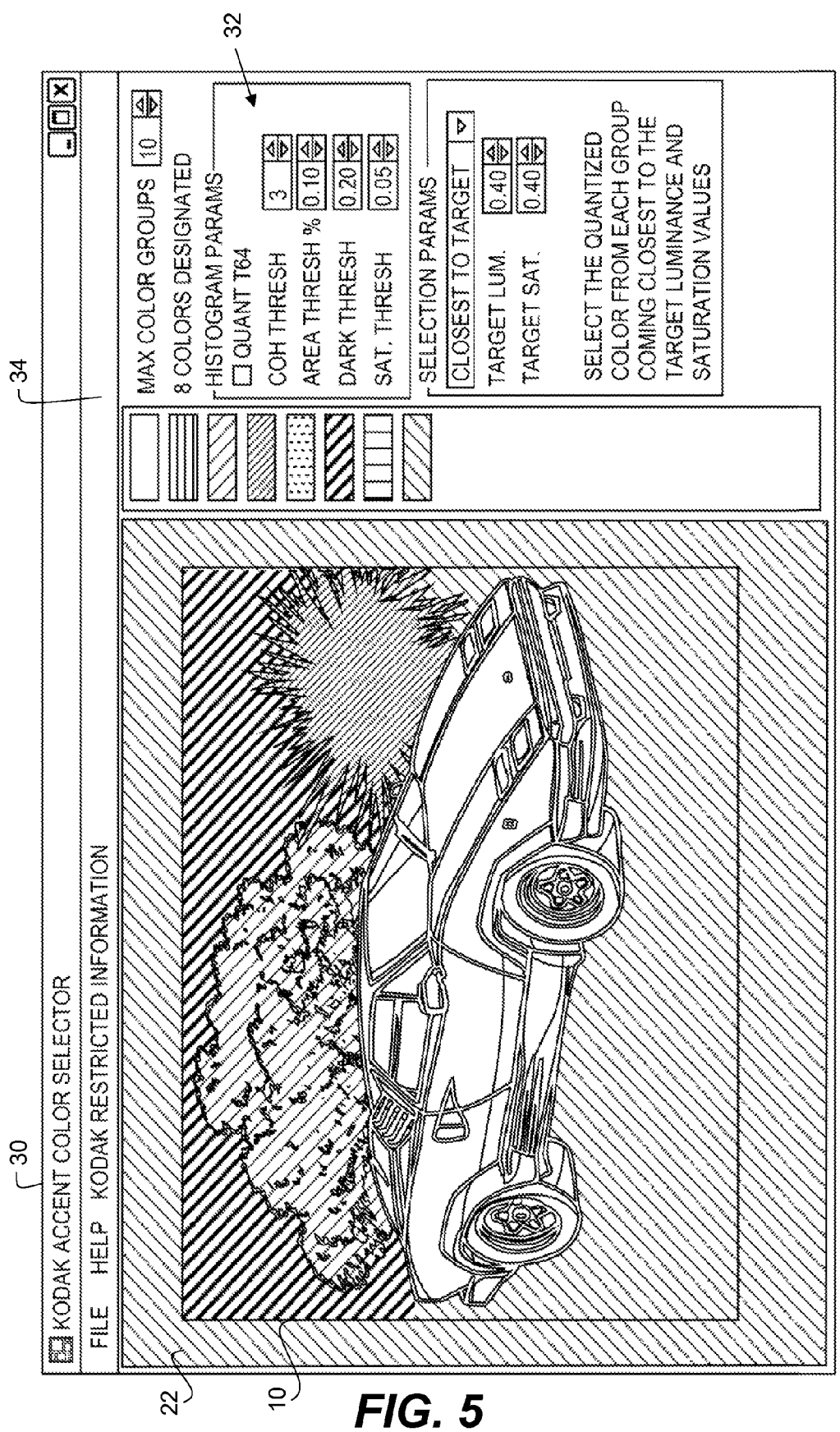
FIG. 5 is a presentation screen useful in implementing a method of an embodiment of the present invention.

Referring to FIG. 5, an example user interface useful in selecting accent colors and then compositing the selected accent color as a matte surrounding the image according to the present invention is shown. In this example, a digital image 10 is displayed within a sample presentation 22 within a presentation window 30 of a computer graphical user interface. A selection of color options 34 corresponding to colors determined by analyzing the digital image 10 using the method of the present invention is shown to the right of the digital image 10, together with a set of user-interactive controls 32 useful in defining the color and spatial variation desired for the imaging-related product (in this example a matte surround). In another embodiment of the present invention, the user-interactive controls 32 can be determined and set automatically without requiring any user input. The composited result selected using the user-interface of FIG. 5 can then be printed, for example with an electro-photographic printer, laser thermal printer, or inkjet printer.

In a preferred embodiment of the present invention, the color options 34 are determined using an algorithm that creates a color histogram for the digital image 10. For computational tractability, the histogram is constructed using a color representation yielding fewer bins than the total number of colors that can be expressed by typical 24-bit RGB values. Each pixel is tested for coherency with its neighboring pixels before being added to the histogram. This test avoids transitional pixels that occur on edges or as parts of strong patterns that can be perceived differently from non-transitional pixels, for example those found in patches of pixels that share similar color values, and provides both spatial and color coherency. The histogram of spatially coherent colors is examined. Colors with insufficient population (low histogram frequency)

and those colors too close to neutral to be perceived as colorful are discarded. In order to limit the number of colors displayed to the user and to ensure that the colors chosen for display to the user are sufficiently different, the remaining colors are clustered by hue into groups. A representative of each group is selected using different methods for correspondingly different selection criteria. The selected colors are displayed for the user. When the user selects a color, the color is applied to the background matte surrounding the image.

In a preferred embodiment of the present invention, colors can be clustered into groups by hue by using the following process. The average pixel color of the members of each histogram bin are expressed using a color space representation such as HSV, HSL or some other luminance-chrominance color space for which hue angle can be readily computed such as CIELAB or CIELUV described in chapter 13 of "Computer Graphics Principles and Practice", by Foley, et al. (Addison-Wesley, Boston, 1996). The distances between color bins are calculated from the differences in hue angle. A complete link agglomerative clustering algorithm such as the one described by Anil K. Jain in Chapter 3 of "Algorithms for Clustering Data" (Prentice-Hall, Englewood Cliffs, N.J., 1988), can be used to cluster these colors into groups.

Representative colors for each group can be selected or created using one of several different methods to determine the degree of matching with a desired color characteristic. A representative color may be created that is the average color of all of the samples in the group. Alternately, the color bin closest to the average color of the group may be selected. Some applications may favor colors with certain characteristics. Colors with the highest saturation may be selected, or colors that come closest to an ideal saturation or luminance level may be preferred. Other selection criteria will be addressed later.

In further embodiments of the present invention, a plurality of images can be processed, common colors identified, and an imaging-related product selected that employs a common color (or a color complementary to the common color, or a color found in one image and complementary to a color found in another). This is particularly useful for products that have openings for multiple images, such as template backgrounds and picture frames that hold multiple images. The imaging-related product can also be analyzed to find spatially coherent color clusters that are matched to multiple images, thus automating what can otherwise be a tedious and difficult task.

In a preferred embodiment of the present invention using a plurality of images, the histogram used for selecting colors can be constructed in several manners. A single histogram can be created from the combined pixels of the separate images. Alternately, a single histogram can be created by combining the histograms of the separate images. Such a combined histogram may be constructed from the union or intersection of the histograms of the separate images. Those skilled in the art will recognize that many other methods of combination can be employed.

In yet another embodiment of the present invention, colors of spatially coherent color clusters that are not near the edge or border of an image are preferentially selected to avoid clashing or blending with colors found in the imaging-related product, thus improving the aesthetic quality of the composited or combined result.

As used herein, complementary colors are those colors that are deemed by a human observer to provide a harmonious combination. Such combinations can be of colors that are strictly complementary on a color wheel, but can also include colors that are part of a common color chord, as is taught in literature on color matching, such as "The Principles of Harmony and Contrast of Colors and Their Applications to the Arts" by Chevreul (Schiffer, West Chester, Pa., 1987) and "The Elements of Color", by Itten (John Wiley & Sons, Germany, 2003). Likewise, matching colors can include those colors whose hues are close enough that a user cannot distinguish the difference or whose hues are close enough so that objectionable color clashing does not occur. Furthermore, it is often desirable to employ a color whose luminance is different but whose hue is similar when selecting matching colors, that is, colors that are a darker or brighter shade than is found in the image can be employed. In particular, it is often desired that the image be brighter than the imaging-related product (e.g. a matte surround or frame), so a matching color might have a similar hue to a spatially coherent color cluster found within a desired image but have a reduced luminance.

Prior art techniques, for example determining matte colors by calculating an average image color or an average object color, are inadequate for providing aesthetic colors useful in imaging-related products associated with a specific image. Such techniques fail to determine accent colors effectively, since an object, or image, can have color elements within it that are markedly different from the average color of the object or image. Average colors of an image or object within an image are often gray. Furthermore, color representations on a computer are often different from the color of the actual image or imaging-related product. Hence, the present invention provides an improved method for matching images with imaging-related products. Those desiring to match images to imaging-related products also benefit from providing different color choices derived from different color clusters having different colors within an image. Such choices allow one to indulge personal preferences while ensuring suitable color matching.

The invention has been described in detail with particular reference to certain preferred embodiments thereof, but it will be understood that variations and modifications can be effected within the spirit and scope of the invention.

PARTS LIST 10 digital image
12 color cluster
14 main subject
16 color cluster
20 imaging-related products
22 sample presentation
24 matte surround
26 matte surround
26 matte surround
30 presentation window
32 user-interactive controls
34 color options
100 provide image step
105 find spatially coherent color clusters in image step
110 form image color histogram step
115 select image color step
116 find main subject step
117 find spatially coherent color clusters in image step
118 form color histogram of color clusters step
119 select image color step
120 find spatially coherent color clusters in product step
125 form color histogram of product color clusters step
130 select image product(s) step
135 present selected product choices step
140 construct selected product step
145 combine image and product step

The invention claimed is:

1. A method comprising:
   using a processor to form an image-color histogram of spatially-coherent color clusters within an image, wherein the image-color histogram indicates a frequency of occurrence of spatially-coherent color clusters within the image, and wherein the spatially-coherent color clusters are groups of similarly-colored pixels that are spatially adjacent within the image;
   selecting, via the processor, an image color from the image-color histogram having a frequency of occurrence in the image high enough to be visible to an image observer;
   selecting, via the processor, an imaging-related product having the selected image color or having a color complementary to the selected image color, wherein the selecting the imaging-related product includes:
      forming a product color histogram of spatially coherent color clusters within the imaging-related product, wherein the product color histogram indicates a frequency of occurrence of spatially coherent related colors in the imaging-related product;
      selecting a product color having a frequency of occurrence in the imaging-related product high enough to be visible to an image observer; and
      matching the selected product color with the selected image color; and
   combining, via the processor, the image and the imaging-related product.

2. The method of claim 1, further comprising selecting a plurality of imaging-related products having the selected image color or another image color selected from the image-color histogram or having a color complementary to the selected image color or another image color selected from the image-color histogram.

3. The method of claim 2, further comprising presenting the plurality of imaging-related products or a representation of the plurality of imaging-related products.

4. The method of claim 3, further comprising presenting the plurality of imaging-related products or the representation of the plurality of imaging-related products in an order.

5. The method of claim 4, further comprising calculating a degree of matching for each of the plurality of imaging-related products and the image; and defining the order based on the degree of matching.

6. The method of claim 1, wherein the imaging-related product includes more than one image color having a high frequency of occurrence.

7. The method of claim 1, wherein the imaging-related product includes more than one color complementary to an image color having a high frequency of occurrence.

8. The method of claim 1, wherein the imaging-related product has both a neutral color and a selected color.

9. The method of claim 1, wherein the imaging-related product is constructed after the color is selected.

10. The method of claim 1, wherein the image is a digital image, and wherein the digital image is digitally composited with the imaging-related product and constructed together with the imaging-related product.

11. The method of claim 1, wherein colors of spatially coherent color clusters that are not near the edge or border of the image are preferentially selected to avoid clashing or blending with colors found in the imaging-related product.

12. The method of claim 1, further comprising:
   forming a second image-color histogram of spatially-coherent color clusters within a second image, wherein the second image-color histogram indicates a frequency of occurrence of image colors in the spatially-coherent color clusters within the second image, and wherein the spatially-coherent color clusters are groups of similarly-colored pixels that are spatially adjacent within the second image;
   selecting a second image color from the second image-color histogram having a frequency of occurrence in the second image high enough to be visible to an image observer;
   selecting a common or complementary color from both the selected image color and the second selected image color from both the image and second image;
   selecting an imaging-related product having the common or complementary color within the imaging-related product; and
   combining the image, the second image, and the imaging-related product.

13. The method of claim 1, wherein the spatially coherent color clusters are determined by measuring a spatial distance between pixels in the image together with the color distance.

14. The method of claim 1, wherein the spatially coherent color clusters are determined by color segmentation.

15. The method of claim 1, wherein the matches are ordered in a list.

16. The method of claim 1, further comprising determining a main subject of the image and preferentially selecting a color included in the main subject that is not a flesh tone.

17. The method of claim 1, wherein the imaging-related product is a picture frame, an album cover, a mug, a calendar page, a matte, or a page surround.

18. A method of combining an image with an imaging-related product, the method comprising:
   using a processor to form an image-color histogram of spatially-coherent color clusters within an image, wherein the image-color histogram indicates a frequency of occurrence of image colors in the spatially-coherent color clusters within the image, and wherein the spatially-coherent color clusters are groups of similarly-colored pixels that are spatially adjacent within the image;
   selecting, via the processor, an image color from the image-color histogram having a frequency of occurrence in the image high enough to be visible to an image observer;
   selecting, via the processor, an imaging-related product having the selected image color or having a color complementary to the selected image color; and
   combining, via the processor, the image and the imaging-related product;
   wherein the imaging-related product is selected or constructed to include texture within one or more regions of the selected image color or within one or more regions of the color complementary to the selected image color.

19. A system comprising:
   an interface configured to receive an image file including an image;
   a memory configured to store the image file;
   a processor configured to:
      form an image-color histogram of spatially-coherent color clusters within the image, wherein the image-color histogram indicates the frequency of occurrence of image colors in the spatially-coherent color clusters within the image, and wherein the spatially-coherent color clusters are groups of similarly-colored pixels that are spatially adjacent within the image;

select an image color from the image-color histogram having a frequency of occurrence in the image high enough to be humanly visible;

select an imaging-related product having the selected image color or having a color complementary to the selected image color, wherein selection of the imaging-related product comprises:

forming a product color histogram of spatially coherent color clusters within the imaging-related product, wherein the product color histogram indicates a frequency of occurrence of spatially coherent related colors in the imaging-related product;

selecting a product color having a frequency of occurrence in the imaging-related product high enough to be visible to an image observer; and matching the imaging-related product color and the selected image color; and combine the image and the imaging-related product.

20. A system comprising:

an interface configured to receive an image file including an image;

a memory configured to store the image file;

a processor configured to:

form an image-color histogram of spatially-coherent color clusters within the image, wherein the image-color histogram indicates the frequency of occurrence of image colors in the spatially-coherent color clusters within the image, wherein the spatially-coherent color clusters are groups of similarly-colored pixels that are spatially adjacent within the image;

select an image color from the image-color histogram having a frequency of occurrence in the image high enough to be humanly visible;

select an imaging-related product having the selected image color or having a color complementary to the selected image color;

wherein the imaging-related product is selected or constructed to include texture within one or more regions of the selected image color or within one or more regions of the color complementary to the selected image color.

21. A non-transitory computer-readable medium having instructions stored thereon that, upon execution by a computing device, cause the computing device to perform operations comprising:

forming an image-color histogram of spatially-coherent color clusters within an image, wherein the image-color histogram indicates a frequency of occurrence of spatially-coherent color clusters within the image, and wherein the spatially-coherent color clusters are groups of similarly-colored pixels that are spatially adjacent within the image;

selecting an image color from the image-color histogram having a frequency of occurrence in the image high enough to be visible to an image observer;

selecting an imaging-related product having the selected image color or having a color complementary to the selected image color, wherein the selecting the imaging-related product includes:

forming a product color histogram of spatially coherent color clusters within the imaging-related product, wherein the product color histogram indicates a frequency of occurrence of spatially coherent related colors in the imaging-related product;

selecting a product color having a frequency of occurrence in the imaging-related product high enough to be visible to an image observer; and matching the selected product color with the selected image color; and combining, via the processor, the image and the imaging-related product.

22. A non-transitory computer-readable medium having instructions stored thereon that, upon execution by a computing device, cause the computing device to perform operations comprising:

forming an image-color histogram of spatially-coherent color clusters within an image, wherein the image-color histogram indicates a frequency of occurrence of image colors in the spatially-coherent color clusters within the image, and wherein the spatially-coherent color clusters are groups of similarly-colored pixels that are spatially adjacent within the image;

selecting an image color from the image-color histogram having a frequency of occurrence in the image high enough to be visible to an image observer;

selecting an imaging-related product having the selected image color or having a color complementary to the selected image color; and combining the image and the imaging-related product;

wherein the imaging-related product is selected or constructed to include texture within one or more regions of the selected image color or within one or more regions of the color complementary to the selected image color.

* * * * *

UNITED STATES PATENT AND TRADEMARK OFFICE
CERTIFICATE OF CORRECTION

| | | |
|---|---|---|
| PATENT NO. | : 8,630,485 B2 | Page 1 of 1 |
| APPLICATION NO. | : 12/717440 | |
| DATED | : January 14, 2014 | |
| INVENTOR(S) | : Cok et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 649 days.

Signed and Sealed this
Twelfth Day of May, 2015

Michelle K. Lee
*Director of the United States Patent and Trademark Office*